US010156245B2

(12) United States Patent
Luepke et al.

(10) Patent No.: US 10,156,245 B2
(45) Date of Patent: Dec. 18, 2018

(54) HIGH-PRECISION HYDRAULIC ACTUATOR

(71) Applicant: Lockheed Martin Corporation, Bethesda, MD (US)

(72) Inventors: Richard A. Luepke, Fort Worth, TX (US); Anthony R. Mann, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 306 days.

(21) Appl. No.: 15/050,046

(22) Filed: Feb. 22, 2016

(65) Prior Publication Data

US 2017/0241446 A1 Aug. 24, 2017

(51) Int. Cl.

| | |
|---|---|
| ***F16D 31/02*** | (2006.01) |
| ***F15B 11/10*** | (2006.01) |
| ***F15B 3/00*** | (2006.01) |
| ***F15B 1/26*** | (2006.01) |
| ***F15B 15/14*** | (2006.01) |
| ***F15B 15/28*** | (2006.01) |
| ***F15B 21/00*** | (2006.01) |
| ***F15B 21/04*** | (2006.01) |

(Continued)

(52) U.S. Cl.

CPC ................ *F15B 11/10* (2013.01); *F15B 1/26* (2013.01); *F15B 3/00* (2013.01); *F15B 7/005* (2013.01); *F15B 15/149* (2013.01); *F15B 15/2815* (2013.01); *F15B 21/005* (2013.01); *F15B 21/044* (2013.01); *F16H 25/20* (2013.01); *F15B 2015/1495* (2013.01)

(58) Field of Classification Search

CPC .... F15B 3/00; F15B 7/005; F15B 2015/1495; F15B 21/005; F15B 21/044

See application file for complete search history.

(56) References Cited

U.S. PATENT DOCUMENTS

| | | | |
|---|---|---|---|
| 4,607,998 | A | 8/1986 | Hawkes |
| 4,872,310 | A | 10/1989 | Kaye |

(Continued)

FOREIGN PATENT DOCUMENTS

| | | |
|---|---|---|
| DE | 101 43 013 A1 | 3/2003 |

OTHER PUBLICATIONS

European Patent Office Communication re: Extended European Search Report, pursuant to Rule 62 EPC, the EU search report (R.61 EPC) or the partial EU search report/declaration of no search (R.63 EPC) and the EU search opinion; Application No. 17157195.3-1754, dated Aug. 8, 2017.

*Primary Examiner* — Michael Leslie

(74) *Attorney, Agent, or Firm* — Baker Botts L.L.P.

(57) ABSTRACT

An apparatus includes a drive mechanism, a first cylinder comprising a first piston coupled to the drive mechanism, and a second cylinder comprising a second piston. The first cylinder includes a first fluid reservoir and a second fluid reservoir, with the first piston disposed between the first fluid reservoir and the second fluid reservoir. The second cylinder includes a third fluid reservoir and a fourth fluid reservoir, with the second piston disposed between the third fluid reservoir and the fourth fluid reservoir. The apparatus further includes a first fluid line coupling the first fluid reservoir to the fourth fluid reservoir, and a second fluid line coupling the second fluid reservoir to the third fluid reservoir. The first piston comprises a threaded portion disposed in a threaded aperture of the first cylinder.

20 Claims, 5 Drawing Sheets

(51) Int. Cl.

| | |
|---|---|
| ***F16H 25/20*** | (2006.01) |
| ***F15B 7/00*** | (2006.01) |

(56) References Cited

U.S. PATENT DOCUMENTS

| | | | | |
|---|---|---|---|---|
| 5,261,810 | A | 11/1993 | Kamp et al. | |
| 5,481,877 | A * | 1/1996 | Bakke | F15B 7/005 60/571 |
| 5,533,336 | A | 7/1996 | Kiat et al. | |
| 5,773,050 | A | 6/1998 | Wohlrab | |
| 6,102,828 | A | 8/2000 | MacKenzie | |
| 6,109,036 | A | 8/2000 | Koike et al. | |
| 6,533,573 | B2 | 3/2003 | Tamaki et al. | |
| 6,817,859 | B2 | 11/2004 | Dantlgraber | |
| 6,851,261 | B2 | 2/2005 | Geiger | |
| 6,877,977 | B2 | 4/2005 | Wohlrab | |
| 6,971,237 | B2 | 12/2005 | Geiger | |
| 7,124,581 | B2 | 10/2006 | Dantlgraber | |
| 7,913,616 | B2 * | 3/2011 | Aoki | F15B 7/00 100/269.14 |
| 8,118,571 | B2 | 2/2012 | Krisher | |

* cited by examiner

HIGH-PRECISION HYDRAULIC ACTUATOR

TECHNICAL FIELD

This disclosure relates in general to hydraulic actuators and more particularly to an adjustable high-precision hydraulic actuator.

BACKGROUND

During manufacturing, it may be necessary to move heavy objects or to deform or displace a surface. Typically, various types of mechanical actuators may be used for these purposes. Hydraulic actuators can be used to control the force applied to the surface; however, hydraulic actuators lack extremely precise positional adjustability (e.g., those with positional accuracies to 0.001" or less). Additionally, threaded mechanical actuators with precise positional control (e.g., those with high thread count) may tend to fail when used on applications where high load forces are required.

SUMMARY OF THE DISCLOSURE

According to one embodiment, an apparatus includes a drive mechanism, a first cylinder comprising a first piston coupled to the drive mechanism, and a second cylinder comprising a second piston. The first cylinder includes a first fluid reservoir and a second fluid reservoir, with the first piston disposed between the first fluid reservoir and the second fluid reservoir. The second cylinder includes a third fluid reservoir and a fourth fluid reservoir, with the second piston disposed between the third fluid reservoir and the fourth fluid reservoir. The apparatus further includes a first fluid line coupling the first fluid reservoir to the fourth fluid reservoir, and a second fluid line coupling the second fluid reservoir to the third fluid reservoir. The first piston comprises a threaded portion disposed in a threaded aperture of the first cylinder.

Technical advantages of certain embodiments may include allowing for a compact and lightweight apparatus that provides high output forces while also allowing for high-precision adjustability. Some embodiments may allow for force multiplication so that the output force generated by the apparatus is significantly greater than the input force applied to the apparatus. Certain embodiments may allow for measurement and feedback on the amount of movement applied by the apparatus to an object being displaced or deformed. Other embodiments may provide assembly line advantages, such as the decoupling of the cylinders and automation. Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE DISCLOSURE

Figure 1:
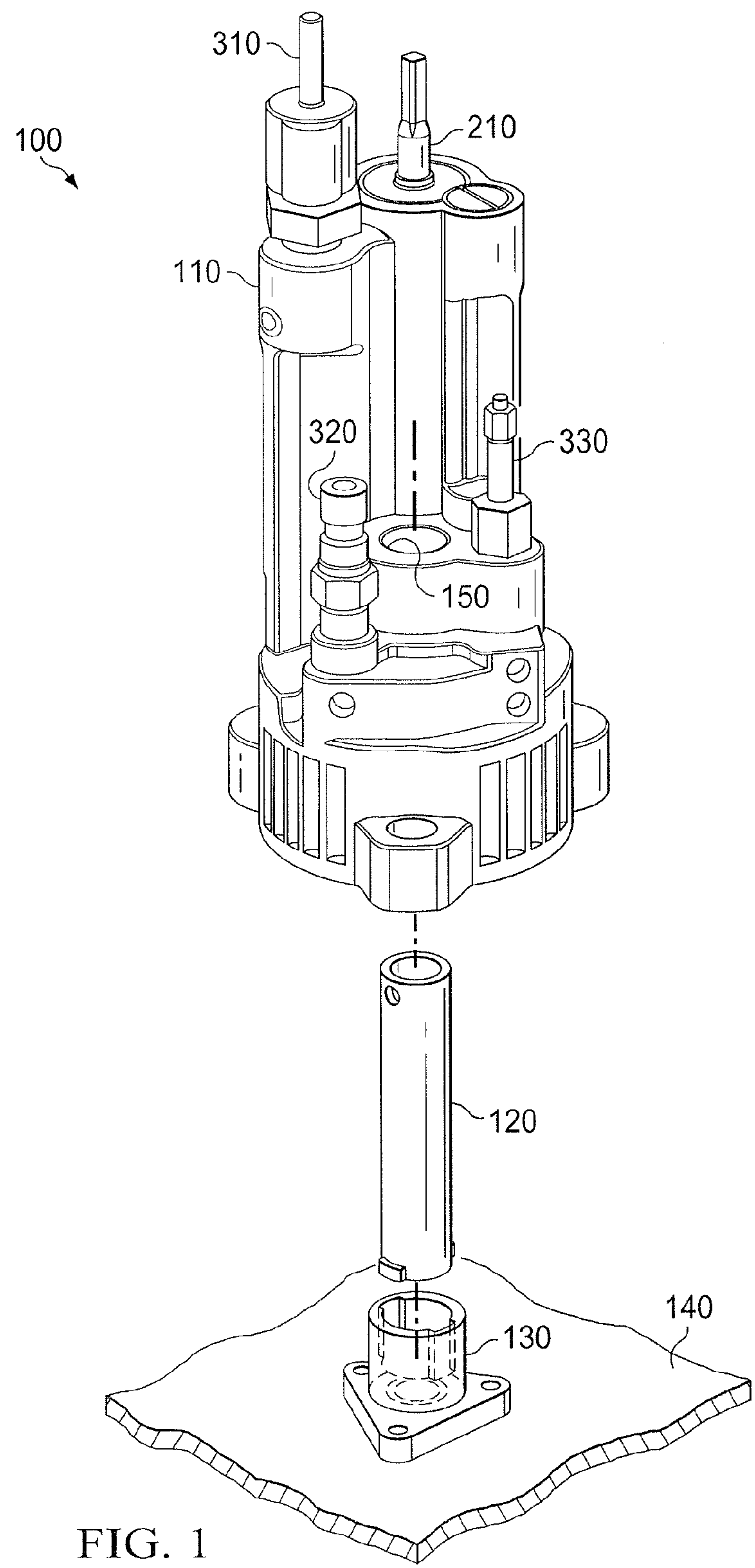
FIG. 1 illustrates an example adjustable actuator system according to embodiments of the present disclosure.

During manufacturing, it may be necessary to move heavy objects or to deform or displace a surface. Typically, various types of mechanical actuators may be used for these purposes. Hydraulic actuators can be used to control the force applied to the surface; however, hydraulic actuators lack extremely precise positional adjustability (e.g., those with positional accuracies to 0.001" or less). Additionally, threaded mechanical actuators with precise positional control (e.g., those with high thread count) may tend to fail when used on applications where high load forces are required.

For example, certain adjustable actuators may utilize machine threads to drive the actuator. A fine adjustment resolution may be achieved by increasing the count of threads-per-inch (TPI), but a higher TPI requires shallower, and therefore, weaker threads. When used on high load force applications, these weak threads may quickly strip loose and/or otherwise fail. Decreasing the TPI results in stronger threads which may be less susceptible to failure; however, fine adjustment resolution is lost. Balancing thread strength and adjustment resolution in a single device has made it difficult to design an adjustable actuator having both high adjustability as well as high load/force handling abilities.

Accordingly, aspects of the present disclosure may combine the adjustability benefits of a thread drive system with the force multiplying effect of a hydraulic piston system. More particularly, the present disclosure describes an actuator that combines the precise positional control and minimal input force of a fine pitch threaded actuator (e.g., tens of in/lbs) with the force multiplying effect of a hydraulic cylinder to achieve both high output force (e.g., hundreds of ft/lbs) with extreme precision. For example, in certain embodiments, an adjustable master actuator having a relatively high TPI adjustment mechanism may be coupled to a high force slave actuator to achieve fine adjustment resolution in high load/force applications. The adjustable master actuator may include a primary piston coupled to a threaded actuator having a relatively high TPI (e.g., approximately 28 TPI, such as in a 7⁄16-28 UNEF-3A threaded actuator), wherein the primary piston may be actuated by rotating the actuator. The force applied to the primary piston may create a high force that is transferred to a hydraulic fluid in the slave actuator. The force in the hydraulic fluid is then applied to a secondary piston in the slave actuator, and is multiplied proportionally according to the area of the secondary piston.

In particular embodiments, the master actuator and slave actuator may be coupled together within the same housing. However, in other embodiments, the master actuator and slave actuator may be located remotely from one another, which may provide increased accessibility to locations that are difficult to access otherwise. Furthermore, particular embodiments may be lightweight when compared with typical servo-driven actuators. By combining the benefits of a threaded drive and the force-multiplying effect of hydraulic pistons, aspects of the present disclosure may allow for highly adjustable actuators for high load/force applications.

To facilitate a better understanding of the present disclosure, the following examples of certain embodiments are given. In no way should the following examples be read to limit, or define, the scope of the disclosure. Embodiments of the present disclosure and its advantages may be best understood by referring to FIGS. 1-4, where like numbers are used to indicate like and corresponding parts FIG. 1 illustrates an example adjustable actuator system 100 according to embodiments of the present disclosure. Adjustable actuator system 100 includes an actuator 110, a shaft 120, a mechanical attachment 130, and a surface 140. Actuator 110 includes a bore 140, a drive mechanism 210, a release valve 310, a fill port 320, and a circuit control valve 330, all of which will be described in more detail below in reference to FIGS. 2-3. Mechanical attachment 130 may be coupled (e.g. mechanically) to surface 140 using any appropriate means. As illustrated, shaft 120 may couple one or more portions of actuator 110 to mechanical attachment 130. However, in other embodiments, one or more portions of actuator 110 may be coupled directly to attachment 130 or surface 140.

In operation, actuator 110 may be used to deform or displace surface 140 by transferring and multiplying an input force applied to drive mechanism 210 to surface 140. More particularly, drive mechanism 210 rotates a piston disposed in the master cylinder of actuator 110, wherein the piston comprises a threaded portion disposed in a threaded aperture of the first cylinder. The threaded portions may have a relatively high TPI according to the present disclosure, which allows for increased adjustment resolution. In certain embodiments, drive mechanism 210 may allow manual rotation of master cylinder 210. For example drive mechanism 210 may be a hex drive, threaded bolt, or adjustable screw, and an operator of drive mechanism 210 may rotate the piston in master cylinder by manually rotating the hex drive or threaded bolt or by using a screwdriver to rotate an adjustable screw. In other embodiments, drive mechanism 210 may allow the piston in the master cylinder to be mechanically rotated, such as by a motor (e.g., a stepper or servo motor) coupled to drive mechanism 210.

Actuator 110 may be used to deform or displace portions of surface 140 by transferring an input force applied to drive mechanism 210 to hydraulic fluid between the piston in the master cylinder and the piston in the slave cylinder of actuator 110. This force is then transferred to mechanical attachment 130 coupled to the piston in the slave cylinder of actuator 110, which is in turn coupled to surface 140 using shaft 120. In certain embodiments, movement of drive mechanism 210 may be a known relation to the output force of actuator 110. For example a 10 degree clockwise rotation of drive mechanism 210 may result in 10 pound increase to the output force of actuator 110. This known relation may be obtained through design, calibration, or experimentation. In certain embodiments drive mechanism 210 may allow high resolution control of the force output created by actuator 110, even with high force applications. In certain embodiments, actuator 110 may act as a force multiplier, transferring an output force to mechanical attachment 130 greater than the input force applied on drive mechanism 210.

Mechanical attachment 130 is any device which can be used to couple actuator 110 to surface 140 to cause a deformation or displacement of surface 140 in response to a net force in any direction from actuator 110. In certain embodiments, mechanical attachment 130 may be coupled to shaft 120, which may in turn be coupled to actuator 110. In certain embodiments, mechanical attachment 130 may be a commercially available device operable to couple to actuator 110 (e.g., using shaft 120) and displace or deform surface 140. Alternatively, mechanical attachment 130 may be a piece specifically manufactured to be used with actuator 110. Mechanical attachment 130 may be any suitable size or shape, depending on the needs of system 110. For example, mechanical attachment 130 may have a circular shape that causes a cylindrical punch in surface 140 in response to a positive net force from actuator 110. As another example, mechanical attachment 130 may have a rounded foot shape such that it curves a flat portion of surface 140 to a desired radius.

Surface 140 may be any surface to be deformed or displaced. As illustrated in FIG. 1, in certain embodiments surface 140 may be substantially flat. In certain embodiments, surface 140 may be part of a product with one or more curved surfaces, such as an aircraft, an automobile, or an item of furniture. For example, surface 140 may initially be at least partially curved or bent but may need additional deformation. In certain embodiments, a manufacturer may wish to displace surface 140 without necessarily deforming it. For example, surface 140 may be temporarily displaced to allow access behind surface 140 or to allow displacement of surface 140 to be measured before it or another surface (not shown) is permanently deformed. Furthermore, surface 140 may be any suitable material. For example, surface 140 may be aluminum, tin, metal alloy, plastic, or any pliable material.

In certain embodiments, actuator 110 may include an internal bore 150. Internal bore 150 may be located proximate to the center of the slave cylinder of actuator 110 or any other suitable location according to the needs of system 100 (e.g., proximate to the center of the master cylinder of actuator 110). Internal bore 150 to allow an operator or sensing device disposed therein to take certain measurements. For example, an operator or sensor disposed in internal bore 150 may determine an amount of deformation in surface 140 based on displacement measurements determined from the change in the location of the piston in the slave cylinder of actuator 110. Such measurements and/or determinations may be aided by a computer system, such as the computing system described below with reference to FIG. 4. In certain embodiments, a combination of a mechanical drive mechanism such as those described in reference to drive mechanism 210 above, one or more sensors (e.g., displacement sensors installed in internal bore 150), and a computer system similar to that described below with regard to FIG. 4 may allow partial or complete automation of system 100 such as in an assembly line system or a feedback loop system.

In certain embodiments, actuator 110 may be a compact unit enclosed within a single exterior housing, as shown in FIG. 1. However, actuator 110 may not be contained within a housing (as shown in FIG. 2), or may be disposed within a plurality of casings (e.g., the master cylinder of actuator 110 in a first housing and the slave cylinder of actuator 110 in a second housing).

In certain embodiments, actuator 110 may include one or more valves 310 and one or more ports 320. Valve 310 may include diverter valves which allow fluid to be removed from the fluid lines of actuator 110. For example, valve 310 may allow a portion of fluid to be diverted away from actuator 110 for cleaning, removal, or flow measurements. As another example, valve 310 may be used to divert fluid away from the slave cylinder or master cylinder of actuator 110 while actuator 110 is repositioned or moved. In certain embodiments, valve 310 may not be a diverter valve. Instead, valve 310 may be a pressure valve or any other valve or combination of valves which improve the functionality of actuator 110. Ports 320 may include one or more of a bleed port configured to remove air from the fluid lines of actuator 110, a charge port configured to add hydraulic fluid to the fluid lines of actuator 110, or any other port or combination of ports which improve the functionality of actuator 110.

Modifications, additions, or omissions may be made to FIG. 1 without departing from the scope of the present disclosure. For example, although illustrated as being contained within a single housing, portions of actuator 110 may be located in separate housings. As another example, although illustrated as having one valve 310 and one port 320, actuator 110 may include any number of valves 310 or ports 320 which allow fluid to be removed or added to actuator 110 without decoupling parts therefrom. As yet another example, although actuator 110 is shown as a single unit, one or more components of actuator 110 may be separated by large distances. For example, if surface 140 was quite large or oddly shaped, the master cylinder of actuator 110 could be located some distance from the slave cylinder of actuator 110.

Figure 2A:
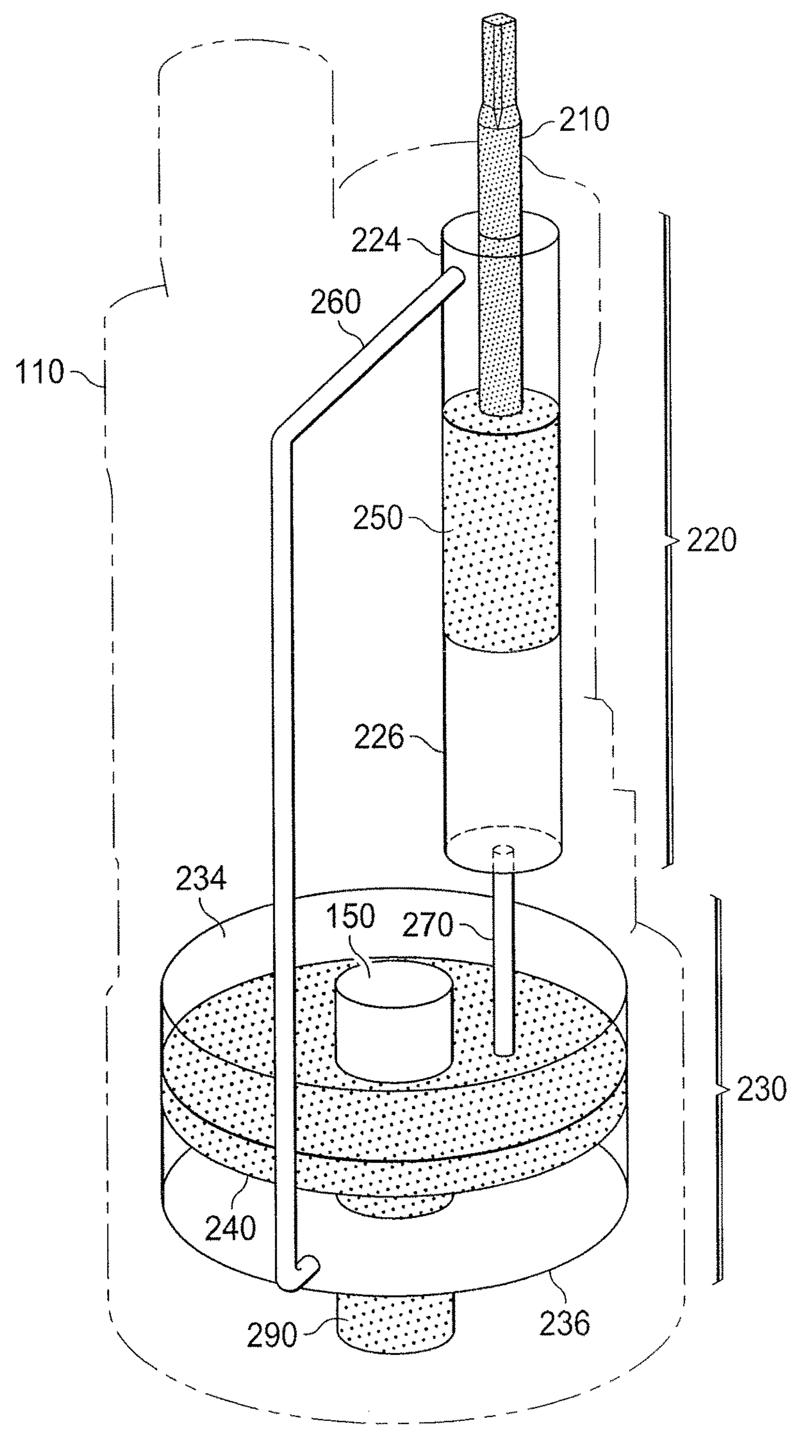
FIGS. 2A-2B illustrate functional views of the actuator of FIG. 1 according to embodiments of the present disclosure.
Figure 2B:
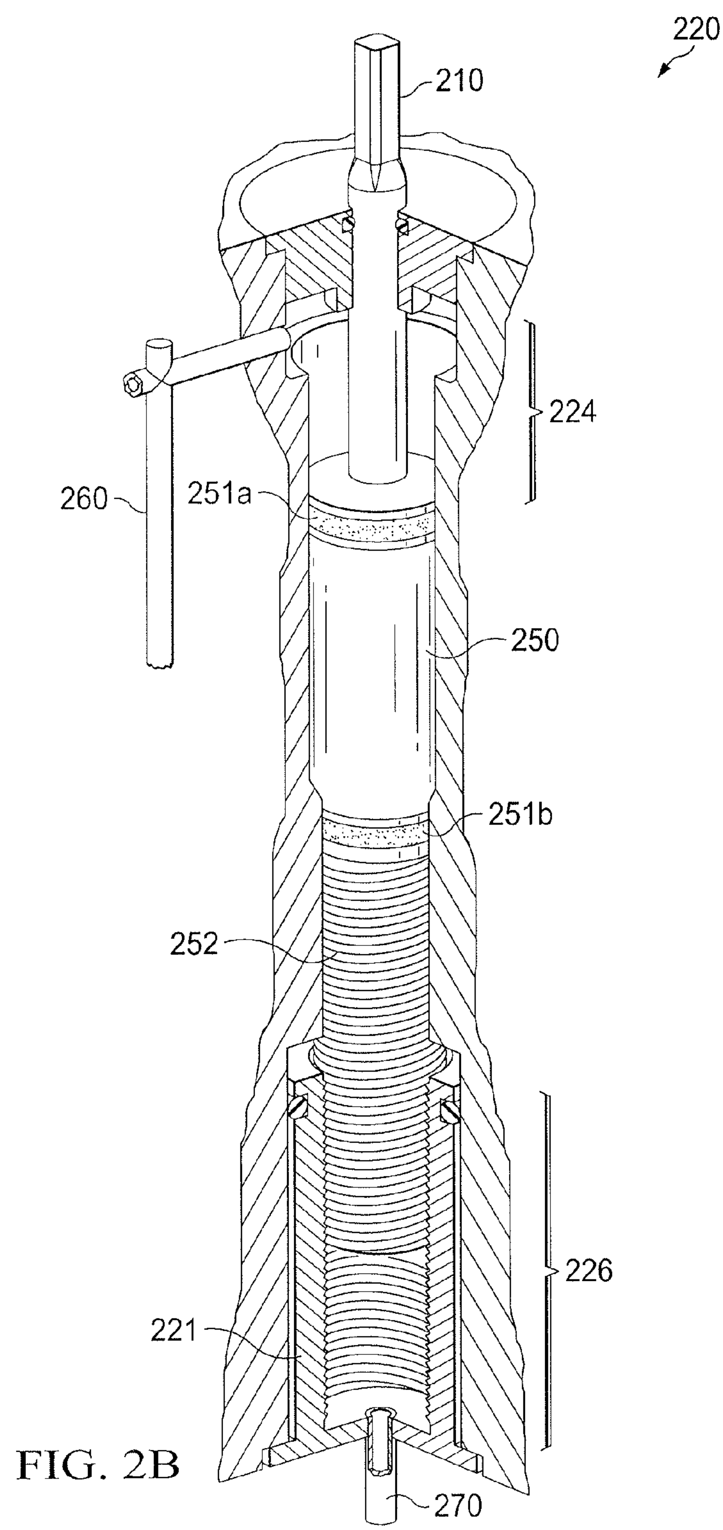

FIGS. 2A-2B illustrate functional views of actuator 110 of FIG. 1 according to embodiments of the present disclosure. Referring to FIG. 2A, actuator 110 includes master cylinder 220 and slave cylinder 230. Master cylinder 220 is divided into fluid reservoirs 224 and 226, and slave cylinder 230 is divided into fluid reservoirs 234 and 236. Actuator 110 also includes drive mechanism 210 coupled to master piston 250 that is disposed between the two reservoirs 224 and 226 of master cylinder 220. Slave cylinder 230 includes a slave piston 240 disposed between the reservoirs 234 and 236 of slave cylinder 230.

Shaft 290 may be any rigid member of any shape that can transfer force applied to slave piston 240 to one or more surfaces. Shaft 290 may have a diameter less than a diameter of slave piston 240 and inner bore 150, allowing shaft 290 to fit within slave piston 240 and inner bore 150 so that shaft 290 may couple with slave piston 240 to apply force to the one or more surfaces coupled to shaft 290. Shaft 290 may be coupled to a mechanical attachment similar to mechanical attachment 130 of FIG. 1. In certain embodiments, the mechanical attachment may be operable to pivot about an end of shaft 290. In certain embodiments, shaft 290 is an individual member that couples to slave piston 240 and mechanical attachment 130 in any suitable manner. For example, shaft 290 may be coupled to a mechanical attachment and slave piston 240 using a standard coupling mechanism such as a lock and key mechanism, or bolts and linkage components. As another example, shaft 290 may have an end specially designed to aid coupling to a specific embodiment of mechanical attachment 130 or slave partition 270. For example, shaft 290 may include one or more protrusions or "keys" and the mechanical attachment may include a "lock" that is adapted to allow entry of the "keys", allowing for shaft 290 to be securely fastened within the mechanical attachment when shaft 290 is rotated within the "lock" of the mechanical attachment. In certain embodiments, slave piston 240 and shaft 290 may be one inseparable piece, such as a piston head and shaft. Furthermore, in certain embodiments, shaft 290 and the mechanical attachment may be one inseparable piece or essentially one piece. For example, shaft 290 may have an end specially designed to deform a surface without need for any further attachments.

Master cylinder 220 and slave cylinder 230 are coupled together via fluid lines 260 and 270. Fluid lines 260 and 270 may be rigid or flexible, and may be made of any material suitable for transporting a fluid. For example, fluid lines 260 and 270 may be made of metal tubing such as copper, aluminum alloy, steel, or titanium. As another example, fluid lines 260 and 270 may be made of flexible hose. Fluid line 260 couples reservoir 236 of slave cylinder 230 to reservoir 224 of master cylinder 220, and fluid line 270 couples reservoir 234 of slave cylinder 230 to reservoir 226 of master cylinder 220. In particular embodiments, the sum of the volume of reservoir 224, fluid line 260, and reservoir 236 together is approximately equal to the sum of the volume of reservoir 226, fluid line 270, and reservoir 234. In certain embodiments, the diameter of master cylinder 220 is less than the diameter of slave cylinder 230, which may allow for multiplication of the force applied to drive mechanism 210.

Master cylinder 220 and slave cylinder 230 may each be substantially cylindrical, although they need not be perfectly cylindrical or uniform. In certain embodiments, master cylinder 220 or slave cylinder 230 may be shaped according to the shape of actuator 110. Master cylinder 220 and slave cylinder 230 may made of any suitable material or combination of materials that can hold a fluid and is rigid enough to allow a seal to form as described below. For example, master cylinder 220 and slave cylinder 230 may be made of aluminum, tin, metal alloy, stainless steel, or plastic. In certain embodiments, master cylinder 220 and/or slave cylinder 230 may have an inner coating or liner which may help to prevent reaction with or degradation of the fluids contained therein. Master cylinder 220 and/or slave cylinder 230 may have walls which are hollow, solid, or any combination of the two. In certain embodiments, the interior sides of master cylinder 220 and/or slave cylinder 230 may have ridges or groves which help the guide the movement or enhance the sealing function of master piston 250 or slave piston 240, respectively.

The reservoirs 224 and 226 of master cylinder 220 and slave cylinder 230 may each be any structure, cavity, or bore which can contain a fluid, change volume in response to movement of master piston 250. Similarly, the reservoirs 234 and 236 of slave cylinder 230 may each be any structure, cavity, or bore which can contain a fluid, change volume in response to movement of slave piston 240. For example, the respective reservoirs of master cylinder 220 and slave cylinder 230 may be flexible polymer bags or linings placed within the interior of master cylinder 220 and slave cylinder 230. In certain embodiments, master cylinder 220 and/or slave cylinder 230 may include one or more sealed openings to allow access to the interior of the respective cylinders or fluid reservoirs therein. In other embodiments, master cylinder 220 and/or slave cylinder 230 are sealed without any openings.

Master piston 250 prevents fluid from moving between fluid reservoir 224 and fluid reservoir 226, and may be made of any material suitable such as metal, plastic, or rubber. In certain embodiments, master piston 250 hydraulically isolates fluid reservoir 224 from fluid reservoir 226. In certain embodiments, master piston 250 in master cylinder 220 forms a hydraulic actuator. In certain embodiments, master piston 250 may be a combination of elements with different functionality such as a piston head for moving fluid and lower and upper O-rings to prevent fluid leakage. In certain embodiments, master piston 250 may be configured to form a seal against the interior wall of master cylinder 220 without O-rings. For example, master piston 250 may be a piston head or a movable flange or seal. In an example embodiment, master piston 250 is configured to form a seal against the interior of master cylinder 220 by having a shape matching at least a portion of the shape of the interior wall of master cylinder 220. More particularly, if one portion of interior wall of master cylinder 220 is curved in shape, master piston 250 may be formed so as to match the curved shape of interior wall of master cylinder 220.

In certain embodiments, the diameter of slave cylinder 230 may be greater than the diameter of master cylinder 220, allowing for multiplication of an input force applied to drive mechanism 210. For example, the diameters of master cylinder 220 and slave cylinder 230 may be configured such that the output force of slave cylinder 230 may be four times greater than an input force applied to drive mechanism 210. Other diameters or configurations allowing for more, less, or no force multiplication are contemplated by the present disclosure. In addition, the diameters, lengths, and fluid volumes of master cylinder 220 and slave cylinder 230 may be configured in many different variations to allow other suitable mechanical advantages depending on the system needs. In certain embodiments, master cylinder 220 and slave cylinder 230 may not have a one to one correlation. For example, a single master cylinder 220 may drive multiple slave cylinders 230 in particular embodiments. As another example, multiple master cylinders 220 may drive a single slave cylinder 230 in particular embodiments.

Referring now to FIG. 2B, which illustrates a detailed view of master cylinder 220, master piston 250 comprises one or more O-rings 251 that seal reservoir 224 from reservoir 226. Master piston 250 further comprises a threaded portion 252 disposed within threaded aperture 221 of master cylinder 220. The threads of threaded portion 252 may have any suitable TPI count, depending on the needs or design of actuator 110. For example, threaded portion 252 may have a TPI of greater than 20 (e.g., approximately 28 TPI). Such TPI values may allow for precise adjustments to the volumes of fluid reservoirs 224 and 226 of master cylinder 220. In addition, the threads of threaded portion 252 may have a TPI designed to permit high resolution and control of output forces generated by actuator 110. Threaded aperture 221 provides traction for the threads of threaded portion 252. Threaded aperture 221 may be separate from the interior wall of master cylinder 220 as illustrated, or may be integrated with master cylinder 220. Threaded portion 252 and threaded aperture 221 may be each made of the same material as master piston 250 and master cylinder 220, respectively, or of different materials. For example, while master piton 250 and/or the interior walls of master cylinder 220 may be made of an aluminum alloy to decrease the weight of actuator 110, threaded portion 252 and threaded aperture 221 may be made of a stronger material (e.g., titanium) to prevent failure. Threaded aperture 221 may run any suitable length of master cylinder 220, such as only a portion of master cylinder 220 as illustrated in FIG. 2B.

As described above, in operation, drive mechanism 210 rotates master piston 250 disposed in master cylinder 220, wherein threaded portion 252 disposed in threaded aperture 221 causes master piston 250 to move in master cylinder 220. The input force applied to drive mechanism 210 is transferred to the hydraulic fluid in reservoirs 226 and 234 and fluid line 270, and then transferred to slave piston 240 in slave cylinder 230. The force applied to slave piston 240 is then transferred to shaft 290 to deform or displace a surface coupled to shaft 290. Threaded portion 252 may have a relatively high TPI to allow for high adjustment resolution, and the force applied to drive mechanism 210 may be multiplied according to the difference in the respective diameters of master piston 250 and slave piston 240. Accordingly, actuator 110 may achieve high adjustment resolution in high load/force applications.

Modifications, additions, or omissions may be made to FIGS. 2A-2B without departing from the scope of the present disclosure. For example, although illustrated as both being normal to the vertical axis in FIG. 2, master cylinder 220 and slave cylinder 230 may be orientated in any suitable way, such as normal or perpendicular to the vertical axis of FIG. 2. In addition, master cylinder 220 and slave cylinder 230 need not be in the same orientation. As another example, although illustrated in close proximity with one another, master cylinder 220 and slave cylinder 230 may have additional spatial separation from one another. Such separation may be advantageous where limited access or space constraints make it difficult to rotate drive mechanism 110. Other volume, length, or diameter configurations of certain components of FIG. 2 may be modified according system needs.

Figure 3:
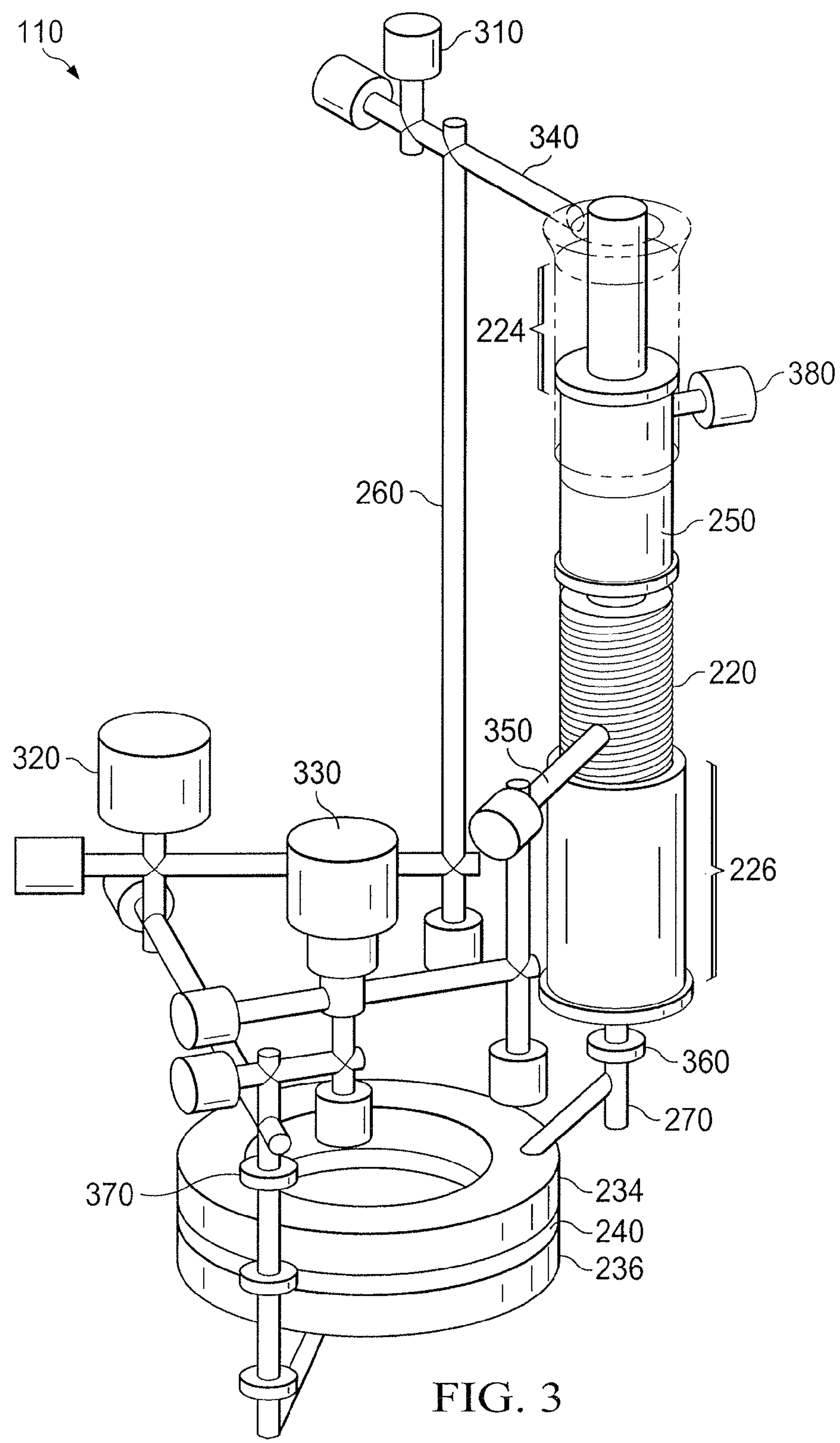
FIG. 3 illustrates an example fluid line architecture of the actuator of FIG. 1 according to embodiments of the present disclosure.

FIG. 3 illustrates an example fluid line architecture of actuator 110 of FIG. 1 according to embodiments of the present disclosure. As described above, actuator 110 may comprise a release valve 310, a fill port 320, and a circuit control valve 330. In certain embodiments, actuator 110 may further comprise upper master cylinder fill point 340, lower master cylinder fill point 350, upper slave cylinder fill point 360, lower slave cylinder fill point 370, and leak check point 380. Each of these components may allow an operator to add or remove hydraulic fluid to actuator 110 during servicing, or to determine whether a leak exists in actuator 110 (e.g., with leak check point 380).

Circuit control valve 330 may be a valve that allows the fluid line architecture of actuator 110 to be operated in an open or closed mode of operation. For instance, in the open mode of operation, circuit control valve 330 may be opened to allow for the flow of hydraulic fluid between the various lines depicted in FIG. 3. Accordingly, fluid may be added at fill port 320 and may flow into the reservoirs 224, 226, 234, and 236 via upper master cylinder fill point 340, lower master cylinder fill point 350, upper slave cylinder fill point 360, lower slave cylinder fill point 370, respectively. If air is in the fluid lines, it may be released at release valve 310. In addition, excess hydraulic fluid may be removed from the fluid lines using release valve 310. In the closed mode of operation, circuit control valve 330 may be closed, and the hydraulic fluid may flow through the fluid lines in response to movements in the master and slave pistons of actuator 110 as described above.

Modifications, additions, or omissions may be made to FIG. 3 without departing from the scope of the present disclosure. For example, although illustrated as having one release valve 310, actuator 110 may include fewer or additional release valves.

Figure 4:
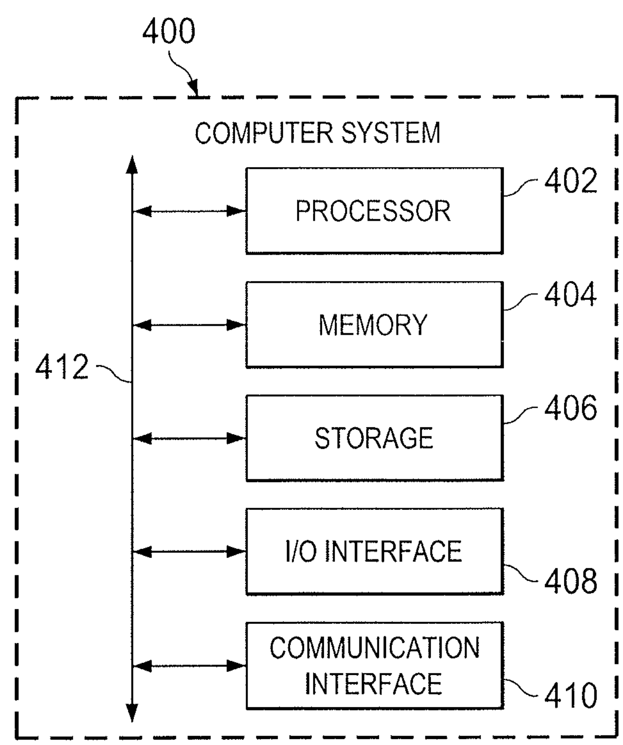
FIG. 4 illustrates an example computer system that may be coupled to portions of the actuator system of FIG. 1 according to embodiments of the present disclosure.

FIG. 4 illustrates an example computer system 400 that may be coupled to portions of actuator system 100 of FIG. 1 according to embodiments of the present disclosure. Computer system 400 may be utilized by one or more devices installed in inner bore 150 of FIG. 1. For example, a displacement sensor may be installed in inner bore 150 and may send signals to computer system 400. In certain embodiments, computer system 400 may store, display, or otherwise use these signals. For instance, in certain embodiments, computer system 400 may control a mechanical motor that drives drive mechanism 210, and computer system 400 may allow complete or partial automation of system 100 based on the signals received from the sensor installed in inner bore 150. As an example, computer system 400 may receive signals from a displacement sensor installed in inner bore 150 and use those signals to calculate an amount of displacement or deformation of surface 140 coupled to actuator 110. In addition, computer system 400 may compare the determined amount of displacement or deformation of surface 140 to a desired deformation amount, and may accordingly increase or decrease the movement of drive mechanism 110 based on to the comparison.

In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As an example, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

The components of computer system 400 may be integrated or separated. In certain embodiments, components of computer system 400 may each be housed within a single chassis. The operations of computer system 400 may be performed by more, fewer, or other components. Additionally, operations of computer system 400 may be performed using any suitable logic that may comprise software, hardware, other logic, or any suitable combination of the preceding.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. An apparatus, comprising:

a drive mechanism being one of a hex drive, a threaded bolt, and an adjustable screw;

a first cylinder comprising a first piston coupled to the drive mechanism, the first cylinder comprising a first fluid reservoir and a second fluid reservoir, the first piston being disposed between the first fluid reservoir and the second fluid reservoir;

a second cylinder comprising a second piston, the second cylinder comprising a third fluid reservoir and a fourth fluid reservoir, the second piston being disposed between the third fluid reservoir and the fourth fluid reservoir;

a first fluid line coupling the first fluid reservoir to the fourth fluid reservoir;

a second fluid line coupling the second fluid reservoir to the third fluid reservoir; and one or more of a release valve configured to remove air from the fluid lines a fill port configured to add hydraulic fluid to the fluid lines, and a circuit control valve configured to selectively allow fluid to flow from the fill port into the fluid lines;

wherein:

the first piston comprises a threaded portion disposed in a threaded aperture of the first cylinder, the threaded portion comprising approximately 28 threads per inch;

a sum of a volume of the first reservoir, the first fluid line, and the fourth reservoir is approximately equal to a sum of a volume of the second reservoir, the second fluid line, and the third reservoir; and a diameter of the first cylinder is less than a diameter of the second cylinder; and wherein the first piston is manually-rotatable by the drive mechanism.

2. A system, comprising:

an apparatus comprising:

a drive mechanism being one of a hex drive, a threaded bolt, and an adjustable screw;

a first cylinder comprising a first piston coupled to the drive mechanism, the first cylinder comprising a first fluid reservoir and a second fluid reservoir, the first piston being disposed between the first fluid reservoir and the second fluid reservoir;

a second cylinder comprising a second piston, the second cylinder comprising a third fluid reservoir and a fourth fluid reservoir, the second piston being disposed between the third fluid reservoir and the fourth fluid reservoir;

a first fluid line coupling the first fluid reservoir to the fourth fluid reservoir; and a second fluid line coupling the second fluid reservoir to the third fluid reservoir;

wherein the first piston comprises a threaded portion disposed in a threaded aperture of the first cylinder;

a shaft coupled to the second piston;

a mechanical attachment coupled to the shaft; and wherein the first piston is manually-rotatable by the drive mechanism.

3. The system of claim 2, wherein a sum of a volume of the first reservoir, the first fluid line, and the fourth reservoir is approximately equal to a sum of a volume of the second reservoir, the second fluid line, and the third reservoir.

4. The system of claim 2, wherein a diameter of the first cylinder is less than a diameter of the second cylinder.

5. The system of claim 2, wherein the threaded portion of the first piston comprises approximately 28 threads per inch.

6. The system of claim 2, wherein the first cylinder and the second cylinder are disposed within a housing.

7. The system of claim 2, wherein the first cylinder and the second cylinder are disposed within separate housings.

8. The system of claim 2, further comprising one or more of a release valve configured to remove air from the fluid lines, a fill port configured to add hydraulic fluid to the fluid lines, and a circuit control valve configured to selectively allow fluid to flow from the fill port into the fluid lines.

9. The system of claim 2, wherein the second cylinder further comprises an inner bore.

10. The system of claim 9, wherein the shaft coupled to the second piston is disposed within the inner bore.

11. The system of claim 10, further comprising:

one or more sensors coupled to the inner bore; and a computer system coupled to the one or more sensors, the computer system comprising a memory and a processor, the memory comprising instructions and the processor configured, when executing the instructions, to record one or more measurements from the one or more sensors.

12. An apparatus, comprising:

a drive mechanism being one of a hex drive, a threaded bolt, and an adjustable screw;

a first cylinder comprising a first piston coupled to the drive mechanism, the first cylinder comprising a first fluid reservoir and a second fluid reservoir, the first piston being disposed between the first fluid reservoir and the second fluid reservoir;

a second cylinder comprising a second piston, the second cylinder comprising a third fluid reservoir and a fourth fluid reservoir, the second piston being disposed between the third fluid reservoir and the fourth fluid reservoir;

a first fluid line coupling the first fluid reservoir to the fourth fluid reservoir; and a second fluid line coupling the second fluid reservoir to the third fluid reservoir;

wherein the first piston comprises a threaded portion disposed in a threaded aperture of the first cylinder; and wherein the first piston is manually-rotatable by the drive mechanism.

13. The apparatus of claim 12, wherein a sum of a volume of the first reservoir, the first fluid line, and the third reservoir is approximately equal to a sum of a volume of the second reservoir, the second fluid line, and the fourth reservoir.

14. The apparatus of claim 12, wherein a diameter of the first cylinder is less than a diameter of the second cylinder.

15. The apparatus of claim 12, wherein the threaded portion of the first piston comprises approximately 28 threads per inch.

16. The apparatus of claim 12, wherein the second cylinder further comprises an inner bore.

17. The apparatus of claim 12, wherein the first cylinder and the second cylinder are disposed within a housing.

18. The apparatus of claim 12, wherein the first cylinder and the second cylinder are disposed within separate housings.

19. The apparatus of claim 12, further comprising one or more of a release valve configured to remove air from the fluid lines, a fill port configured to add hydraulic fluid to the fluid lines, and a circuit control valve configured to selectively allow fluid to flow from the fill port into the fluid lines.

20. The apparatus of claim 12, further comprising:

one or more sensors coupled to the inner bore; and a computer system coupled to the one or more sensors, the computer system comprising a memory and a processor, the memory comprising instructions and the processor configured, when executing the instructions, to record one or more measurements from the one or more sensors.

* * * * *